United States Patent [19]

McMahon

[11] Patent Number: 4,519,252
[45] Date of Patent: May 28, 1985

[54] PRESSURE AND TEMPERATURE COMPENSATED PHOTOELASTIC HYDROPHONE

[75] Inventor: Donald H. McMahon, Carlisle, Mass.

[73] Assignee: Sperry Corporation, New York, N.Y.

[21] Appl. No.: 476,957

[22] Filed: Mar. 21, 1983

[51] Int. Cl.³ .................. H04R 23/00; G01L 1/24
[52] U.S. Cl. .................. 73/655; 250/231 R; 350/96.29; 367/140; 367/149
[58] Field of Search .......... 250/231 R, 231 P; 356/32–34; 367/140, 141, 149, 171, 174; 73/763, 705, 765, 766, 800, 862.38, 862.62, 862.63, 655; 350/96.29

[56] References Cited

U.S. PATENT DOCUMENTS

| | | | |
|---|---|---|---|
| 4,368,645 | 1/1983 | Glenn et al. | 356/33 |
| 4,422,167 | 12/1983 | Shajenko | 73/655 |
| 4,449,210 | 5/1984 | Myer | 350/96.29 |
| 4,466,295 | 8/1984 | Wesson | 73/705 |
| 4,471,474 | 9/1984 | Fields | 73/655 |

*Primary Examiner*—Edward P. Westin
*Attorney, Agent, or Firm*—Howard P. Terry; Seymour Levine

[57] ABSTRACT

An acoustic sensor with ambient pressure and temperature compensation having a photoelastic element positioned between a diaphragm and a support beam. Thin layers of oil between the photoelastic material and both the diaphragm and support beam prevent surface stress of the photoelastic element due to slowly varying pressures while surface stresses are caused thereon by relatively rapid pressure variations.

17 Claims, 8 Drawing Figures

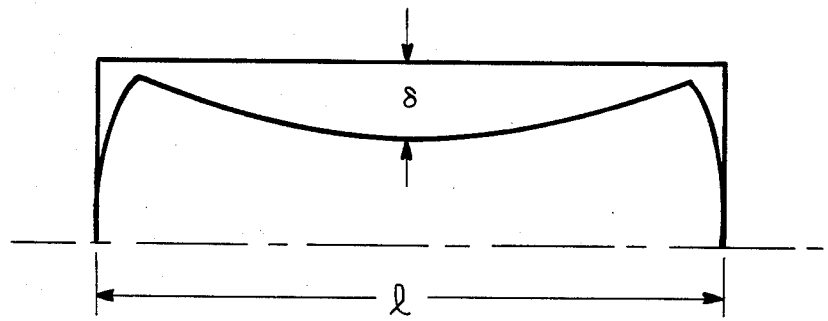
FIG.5.
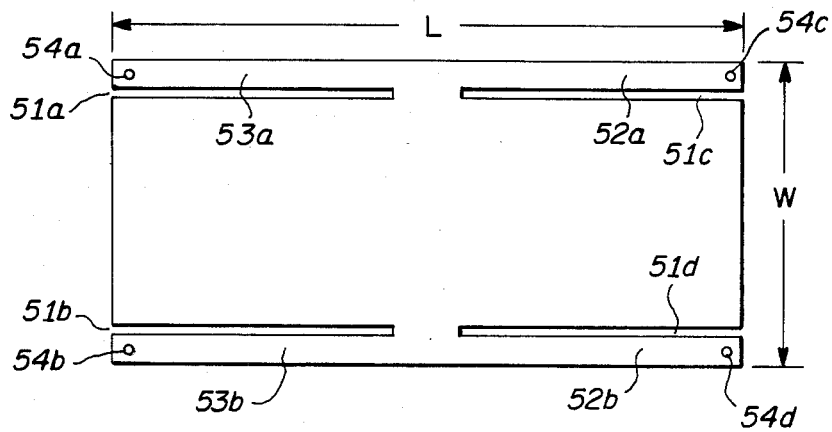
FIG.6.
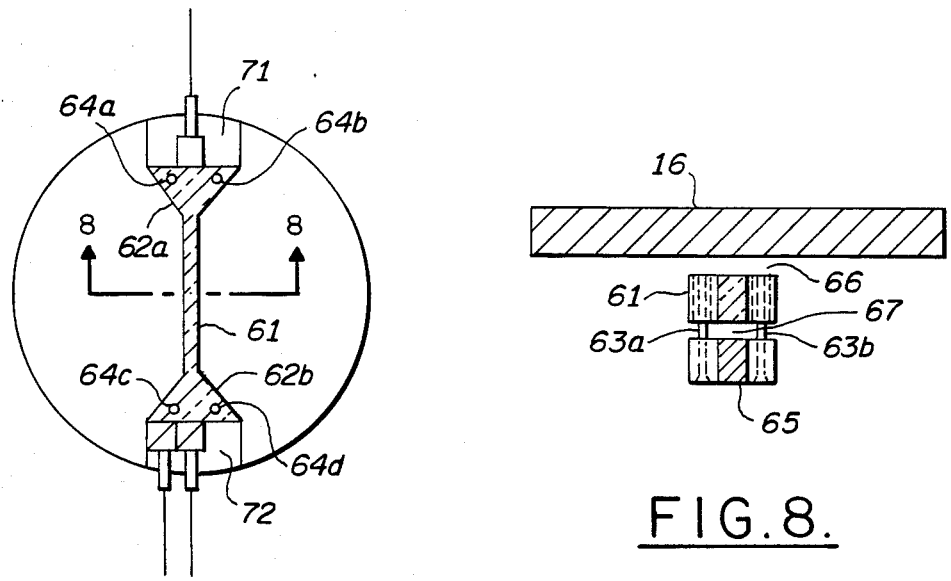
FIG.7.
FIG.8.

PRESSURE AND TEMPERATURE COMPENSATED PHOTOELASTIC HYDROPHONE

BACKGROUND OF THE INVENTION

1. Field of the Invention

The invention pertains to the field of signal detectors and more specifically to signal detectors having mechanisms to achieve automatic compensation for variations in ambient conditions such as temperature and pressure.

2. Description of the Prior Art

Photoelastic materials have been employed in highly rugged, sensitive pressure sensors such as described in U.S. patent application Ser. No. 248,616 filed by McMahon on Mar. 27, 1981, now abandoned and assigned to the assignee of the present invention. Sensors of this type are constructed to transfer external pressures as a uniaxial force to a channel in a photoelastic medium such that optical birefringence is produced and sensed by a collimated light beam that propagates therethrough. To sense optical birefringence the polarization of the input light beam may be resolved into orthogonal components respectively parallel to the optical axes of the photoelastic medium and the phase interference between these two beams measured. The resulting signal is a function of the birefringence induced by the pressure applied to the photoelastic material. In a structure of this type light is coupled to the sensor through an input fiber, it is then collimated, polarized at an 45° angle relative to the stress axis of the photoelastic material, coupled to a channel therein, split into respective paths for each polarization component and the beams in each path thereafter refocused to exit via respective output fiber. Additionally, a quarter wave plate may be positioned between the input polarizer and the propagating channel to optically bias the orthogonal polarizations so that the sensor responds linearly to small external pressure variations.

This principle may be employed to construct photoelastic hydrophone by bonding the photoelastic channel between a metal support and metal diaphragm. The metal diaphragm intercepts the force equal to the pressure times the diaphragm area and applies this force to the smaller critical area of the photoelastic channel, while the support beam provides an immobile backing which insures that the bulk of the elastic yield is in the photoelastic channel. The assembly may be positioned in a fluid filled chamber which is sealed by the metal diaphragm at one end and coupled to a fluid reservoir at the other. As the ambient pressure and temperature change, fluid transfer between the chamber and the reservoir takes place. This transfer reduces, but does not eliminate, the stresses within the photoelastic channel. Thus, the optical bias may vary and adversely effect the hydrophone operation.

Hydrophones are normally expected to operate over a temperature range of 0°–40° C. and a hydrostatic pressure range 0–1,000 PSI. Since Young's modulus and the temperature coefficient of expansion of the metal are not the same as that of the photoelastic material, it is apparent that hydrostatic pressure and ambient temperature changes cause the metal and photoelastic material to yield or elongate by different amounts. This resulting difference in elongation at a joined surface causes substantial stresses to build up in the photoelastic material, that not only move the hydrophone away from its maximum sensitivity bias point, but may cause it to approach or pass through a zero sensitivity bias condition.

To operate efficiently, hydrophones must couple acoustic pressures to the photoelastic material with a minimal of attenuation, and maintain the desired optical bias by preventing stresses therein caused by the bonding of dissimilar materials that behave differently under changes of ambient pressure and temperature. One solution to the problem is to make the diaphragm, channel, and support from the same photoelastic material so that equivalent fractional dimensional changes occur for all portions of a composite structure when subjected to temperature and pressure changes. Disadvantages of this approach are two-fold;

First, the photoelastic support adjacent to the channel is much thicker than the channel and can elongate under acoustic pressures with a dimensional change that is comparable to the channel dimensions. The equal elongations of the channel and support, forces the diaphragm to move twice as far to transmit the same pressure as it would have moved were only the photoelastic channel to yield. Doubling the diaphragm motion requires the volume of the fluid filled chamber to double, thereby effectively doubling the size of the hydrophone. Under an applied stress, the support and photoelastic material function in series to provide part of the restoring force that limits the diaphragm motion. The remainder of the restoring force is supplied by the elasticity of the fluid in the chamber. If the chamber is too small the "spring constant" of the fluid may be comparable or greater than the "spring constant" of the photoelastic channel plus its support. Under these conditions, only a fraction of the total acoustic force is applied to the photoelastic material. Consequently, a sufficiently large chamber must be used if substantially all the acoustic pressure is to be applied to the photoelastic material.

Second, fabricating the diaphragm, channel, and support from the same photoelastic material produces a relatively large and complex shaped structure, permitting significant temperature differences to exist therethrough. These temperature differences may produce strains in the photoelastic channel that move the optical bias from the maximum sensitivity condition. Thus, while an all photoelastic construction substantially removes sensitivity to static or slowly varying temperature changes, the hydrophone may remain intolerably sensitive to more rapid fluctuations in external temperature.

SUMMARY OF THE INVENTION

A hydrophone in accordance with the present invention may include a housing with a fluid filled acoustic chamber wherein the optical elements of the transducer, including a pressure sensitive birefringent element, are positioned. The birefringent element is sandwiched between a support beam secured to the walls of the housing and a diaphragm that seals the acoustic chamber and couples acoustic signals to the birefringent element. Thin layers of oil fill small spacings that separate the birefringent element from the diaphragm and the support beam. Viscosity of the oil that fills the spacing between the birefringent element and adjacent components, which may be the same oil that fills the acoustic chamber, allows rapid pressure fluctuations to be transferred substantially undimished from the diaphragm to the birefringent element, and therefrom to the support beam. Fluid filled separation, however, relieves surface stresses in the birefringent material that would be caused by elongation differences between the birefringent material and the components adjacent thereto due to slowly varying ambient temperature or pressure conditions. Since the thin film of oil between the birefringent element and the adjacent elements compensates for variations in ambient conditions; the adjacent elements may be made of materials appreciably more rigid than the photoelastic material, thereby applying substantially the entire force induced by an incident acoustic signal to the birefringent material.

BRIEF DESCRIPTION OF THE DRAWINGS

FIG. 5 is a deflection diagram useful for describing the deformation of the birefringent material supported as shown in FIGS. 3 and 4.

FIG. 6 is an illustration of a rigid diaphragm that may be utilized with the embodiment of FIG. 1.

FIG. 7 is an illustration of another configuration for the birefringent material that may be utilized with the invention.

FIG. 8 is an exploded cross sectional view of the embodiment of the invention utilizing the birefringent element shape shown in FIG. 7.

DESCRIPTION OF THE PREFERRED EMBODIMENTS

Figure 1:
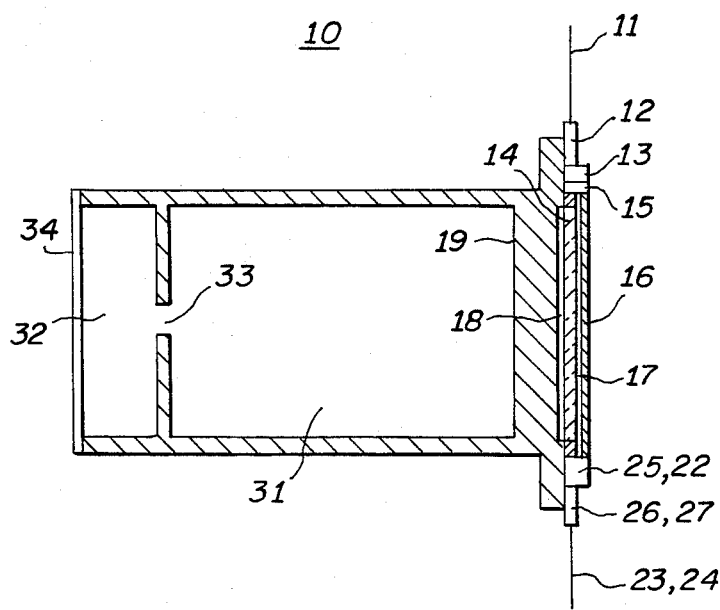
FIG. 1 is an elevation view, in partial cross section of an embodiment of the invention.

Referring to FIG. 1, a light signal for the hydrophone 10 is coupled through an optical fiber 11 to a lens 12 wherefrom a collimated beam of light is incident to a polarizing film or beam splitter 13. Polarized light is then incident to a photoelastic material 14 via a quarter wave plate 15 with the polarization vector at an angle of 45° to the stress axis of the photoelastic material 14. In a manner to be subsequently explained, acoustic signal pressure variations incident to a diaphragm 16 of the hydrophone are applied to the photoelastic medium 14 by the action of oil filling the space 17 between the photoelastic material 14 and the diaphragm 16, and the space 18 between the photoelastic material 14 and a pressure beam 19. Birefringence induced in the photoelastic material 14, by the pressures applied to the hydrophone diaphragm 16, cause the two components of the polarized light incident to a polarizing beam splitter 22, at the output end of the photoelastic material 14, to have a differential phase shift therebetween. The differentially phase shifted components are made to interfere in the ±45° azimuthal direction and the interference signals are coupled via the polarizing beam splitter 22, a prism or a mirror 25, and focussing lenses 26 and 27 to couple signals representative of the sum and difference of the two polarized signals to output optical fibers 23, 24.

Figure 2:
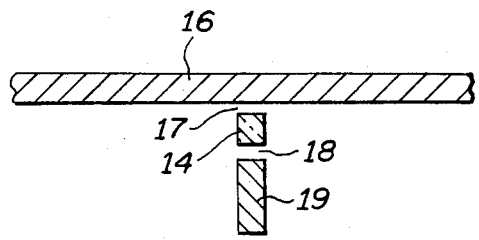
FIG. 2 is a fragmentary view in cross section of a portion of the embodiment of FIG. 1 illustrating the invention on a large scale.

The photoelastic material 14 is sandwiched between the diaphragm 16 and the immoveable pressure support 19 with layers of oil 17 and 18 respectively therebetween. An exploded cross sectional view of this arrangement is shown in FIG. 2. The oil that fills the spacings 17 and 18 may be the same oil that fills the acoustic chamber 31 and reservoir and 32 of the hydrophone. The inherent viscosity of the oil allows rapid fluctuations of pressure to be transferred substantially undiminished from the diaphragm 16 to the photoelastic material 14 and therefrom the support beam 19. Since the support beam 19 is rigid, the back pressure applied to the photoelastic material 14 causes substantially all of the force applied to the diaphragm 16 to be applied to the photoelastic material 14. In essence the high viscosity of the fluid and the narrow gap between the photoelastic material and adjacent elements provides a pressure container that can not relax at acoustic frequencies but can relax over long time intervals. However, the separation of the photoelastic material 14 from the diaphragm 16 and the support beam 19 by fluid layers 17 and 18 allows, with little force, a mutual displacement to occur that substantially eliminates surface stresses in the photoelastic material 14 due to elongation differences between these elements caused by slow variations of ambient temperature or pressure. Thus, the thin fluid layer transfers acoustic pressure variations to, and eliminates surface stresses in the photoplastic material.

Compensation for pressure head and ambient temperatures that differ significantly from selected operating conditions may be accomplished by providing a reservoir 32 which is coupled to the acoustic chamber 31 via an orifice 33. These large variations from the selected norm cause fluid to be transferred between the acoustic chamber 31 and the reservoir 32. This fluid transfer causes a flexible diaphragm 34, that seals the reservoir 32, to expand or contract in accordance with the transfer of fluid, thereby generating internal conditions that establish substantially zero net pressure on the hydrophone diaphragm 16.

A reliable hydrophone requires a fixed position of the optical channel in the photoelastic material relative to other optical components of the system, and an optical bias that is invariable with slow changes in ambient temperature and pressure. Consequently, the photoelastic material must be secured such that strain induced along a light propagation path in the photoelastic material by slow changes in ambient temperature and pressure is neglible relative to one fringe of optical birefringence.

Figure 3:
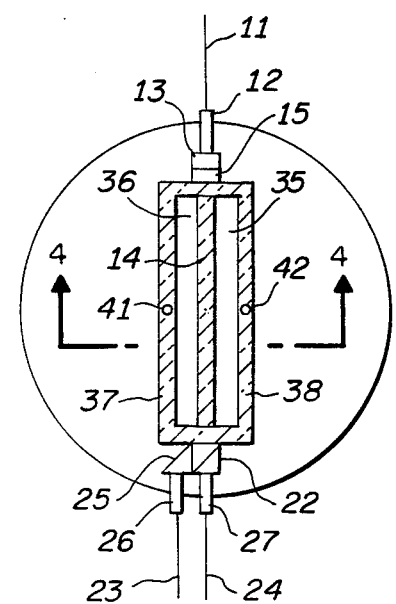
FIG. 3 is an end view, in partial cross section, an embodiment of FIG. 1 with the diaphragm removed.
Figure 4:
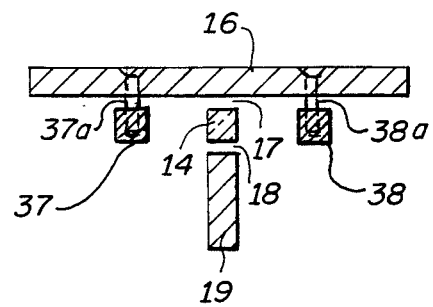
FIG. 4 is an enlarged cross sectional view through the plane 4—4 indicated in FIG. 3.

FIG. 3 shows a configuration for the photoelastic material that may be used to provide the necessary conditional integrity for the light propagating channel with negligible static strain applied thereto. This configuration is achieved by removing two rectangular sections 35, 36 from a rectangular block of photoelastic material, thereby establishing two outer longitudinal sections 37, 38 and an inner section that is the photoelastic material 14 in which the light propagates. The material is supported at one point 41 in the outer longitudinal section 37 by attachment to a fixed support 37a and a second point in the outer longitudinal section 38 by attachment to a fixed support beam 38a, as shown in FIG. 4. When the photoelastic material is attached to a metal, as shown in FIG. 4, slowly varying temperature and pressure changes will cause a differential elongation that will stress the photoelastic material. If the photoelastic is of the type known as PSM-1 having a temperature coefficient of expansion of $6.8 \times 10^{-5}/°C$. and diaphragm 16 is a metal having a temperature coefficient of expansion of $2 \times 10^{-5}/°C$. and the two materials are matched at 20° C., a temperature change of 20° C. will cause a relative photoelastic material-metal displacement of $10^{-3}$ cm for each cm between the support points 41, 42. If the support points are two centimeters apart, the relative displacement between these points and the light propagating channel will in the order of $10^{-3}$ cm. This displacement causes a deformation of the light propagating channel as indicated in FIG. 5.

The force F required to produce a deformation indicated as δ in the center of the light propagating channel may be determined from $$F = 48 \; YI/\delta l3$$

where l is the length, Y is Young's modulus, and I is the moment of inertia of the light propagating channel. Assuming a channel cross section of $0.2 \times 0.2$ cm$^2$ cross section to establish a moment of inertia $I = 4/3 \times 10^{-4}$ cm$^4$ for the light propagating channel, a length thereof $l = 8$ cm, and a Young's modulus for the photoelastic material $Y = 2.3 \times 10^{10}$ dynes/cm$^2$ and a deformation $\delta = 10^{-3}$, then the equivalent force F is $2.5 \times 10^2$ dynes.

The photoelastic effect PSM-1 produces a one hundred percent modulation of an optical beam propagating therethrough when a pressure of $9 \times 10^4$ dynes/cm$^2$ is applied over a one meter path. Considering the parameters mentioned above, fractional modulation due to the deformation of the light propagating channel with temperature is $4 \times 10^{-4}$ and therefore, negligible. In a similar manner it may be shown that the relative elongation between metal and the photoelastic material at the supports give rise to a negligible shift in the optical bias points.

The light propagating channel 14 as shown in FIG. 4 is suspended between a fixed support beam 19 and a diaphragm 16 with thin layers of oil 18 and 17 respectively therebetween. It is necessary to maintain the separation between these elements with thin oil layers. There is no problem between the photoelastic material 14 and the diaphragm 16, since both are fixed in relative position. It is therefore necessary to create a diaphragm 16 which is so supported that substantially all of the external acoustic pressures are applied through the photoelastic channel 14 to the support beam 19 when the channel 14 is in close proximity to and rapidly displaced with respect to the support beam 19.

It is readily ascertainable to those skilled in the art that the diaphragm 16 moves only in the order of $10^{-9}$ cm under the strongest acoustic pressure (1 Pa). Considering a diaphragm size of 16 cm$^2$ a spring that requires much less than 160 dynes (1 Pa $\times$ 16 cm$^2$) would suffice to hold the diaphragm 16. Refer now to FIG. 6 wherein a diaphragm having width $W = 2.4$ cm and length $L = 8$ cm suitable for this purpose is shown. Four cuts 51a–51d, each 0.2 cm from the edges 52a, 52b, create two elastic beams 53a, 53b on either side of the diaphragm. When the diaphragm is 0.2 cm thick, supported at 4 endpoints 54a–54d of the two elastic beams 53a, 53b, and made of metal with a Young's modulus of $6 \times 10^{11}$ dynes/cm$^2$, force of 160 dynes will cause a displacement $\delta = 0.25 \times 10^{-4}$ cm across the central section of the diaphragm that is many orders of magnitude greater than the elongation caused by acoustic pressures. Thus, a diaphragm is constructed that is rigid with respect to microscopic deformation but flexible with respect to acoustic displacements.

FIGS. 7 and 8 show a photoelastic material configuration that may be utilized for the optical channel of the invention. A single section photoelastic material 61, having flares 62a, 62b on either end thereof, may be positioned by passing 4 pins, only 2 of which are shown 63a, 63b, through four fluid filled holes 64a, 64b, 64c, and 64d, two in each flared end section, with sufficient clearance between the pins and the inner surfaces of the holes to prevent surface stresses in the photoelastic material due to differential deformations caused by ambient pressure and temperature. The pressure beam 65 may have a shape similar to that of the photoelastic material 61 with end sections 71, 72 extending from the flare termination for attachment to the housing and with relief spaces beneath flare terminations to preferentially apply pressure only to the optical channel portion. The pins may be of the same material of the pressure beam and attached thereto. As previously discussed, spacings between photoelastic material 61, the diaphragm 16, and the support beam 65 may be maintained by fluid layers 66 and 67 respectively. Though a particular configuration for the support bar has been described, it should be apparent that many of the configurations are acceptable.

While the invention has been described in its preferred embodiments, it is to be understood that the words which have been used are words of description rather than limitation and that changes may be made within purview of the appended claims without departing from the true scope and spirit of the invention in its broader aspects.

I claim:

1. An apparatus for sensing acoustic signals of the type comprising input and output optical fibers and polarizers in cooperation with an element having pressure sensitive birefringent properties further comprising:

housing means having a fluid filled acoustic chamber wherein said polarizers and birefringent element are positioned;

diaphragm means sealing one end of said acoustic chamber for transferring pressure variations caused by incident acoustic signals to said birefringent element and positioned a predetermined distance from one side of said birefringent element with said fluid therebetween, thereby establishing a first fluid filled space;

means fixed to said housing for supporting said birefringent element, and positioned a preselected distance from a side of said birefringent element opposite said one side to form a second space, said second space having said fluid therein, whereby slow variations in ambient pressure and temperature cause said first and second spaces and said fluids therein to vary, thereby substantially relieving substantially static surface stresses in said birefringent element, while rapid pressure fluctuations are transferred therethrough substantially undiminished.

2. An apparatus in accordance with claim 1 wherein said birefringent element comprises a central section of a three section configuration of a photoelastic material with outer sections thereof having secured center regions.

3. An apparatus in accordance with claim 2 wherein said diaphragm means includes first and second outer beams coupled to a center section and having ends secured to said housing.

4. An apparatus in accordance with claim 2 wherein said center regions of said outer sections are secured to said diaphragm means.

5. An apparatus in accordance with claim 4 wherein said diaphragm means includes first and second outer beams coupled to a center section and having ends secured to said housing.

6. An apparatus in accordance with claim 1 wherein said housing includes:
- a first fluid filled chamber, sealed by said diaphragm means, having said support means and said birefringent element positioned therein;
- a second fluid filled chamber coupled to said first fluid filled chamber; and
- flexible diaphragm means for sealing said second fluid chamber.

7. An apparatus in accordance with claim 6 wherein said diaphragm means includes first and second outer beams coupled to a center section and having ends secured to said housing.

8. An apparatus in accordance with claim 6 wherein said birefringent element comprises a central section of a three section configuration of a photoelastic material with outer sections thereof having secured center regions.

9. An apparatus in accordance with claim 8 wherein said diaphragm means includes first and second outer beams coupled to a center section having ends secured to said housing.

10. An apparatus in accordance with claim 6 wherein said center regions of said outer sections are secured to said diaphragm means.

11. An apparatus in accordance with claim 1 wherein:
- said birefringent element has first and second flared ends each having at least two position maintaining holes therein to said housing;
- positioning means coupled to said support means and positioned in said at least two holes in said first and second flared ends of said birefringent element with sufficient clearance therebetween to prevent stresses induced by differential dimensional changes caused by slowly varying ambient pressure and temperature conditions.

12. An apparatus in accordance with claim 11 wherein said support means has first and second ends with flared sections respectively similar to said first and second flared ends of said birefringent element, said first and second ends of said support means extending to said housing and fixedly positioned thereto.

13. An apparatus in accordance with claim 11 wherein said diaphragm means includes first and second outer beams coupled to a center section and having ends secured to said housing.

14. An apparatus in accordance with claim 11 wherein said housing includes:
- a first fluid filled chamber, sealed by said diaphragm means, having said support means and said birefringent element positioned therein;
- a second fluid filled chamber coupled to said first fluid filled chamber; and
- flexible diaphragm means for sealing said second fluid chamber.

15. An apparatus in accordance with claim 13 wherein said housing includes:
- a first fluid filled chamber, sealed by said diaphragm means, having said support means and said birefringent element positioned therein;
- a second fluid filled chamber coupled to said first fluid filled chamber; and
- flexible diaphragm means for sealing said second fluid chamber.

16. An apparatus in accordance with claim 14 wherein said diaphragm means includes first and second outer beams coupled to a center section and having ends secured to said housing.

17. An apparatus in accordance with claim 11 wherein said housing includes:
- a first fluid filled chamber, sealed by said diaphragm means, having said support means and said birefringent element positioned therein;
- a second fluid filled chamber coupled to said first fluid filled chamber; and
- flexible diaphragm means for sealing said second fluid chamber.

* * * * *